Nov. 30, 1937.  E. WILDHABER ET AL  2,100,705
METHOD OF PRODUCING TAPERED GEARS
Filed May 8, 1934   2 Sheets-Sheet 1
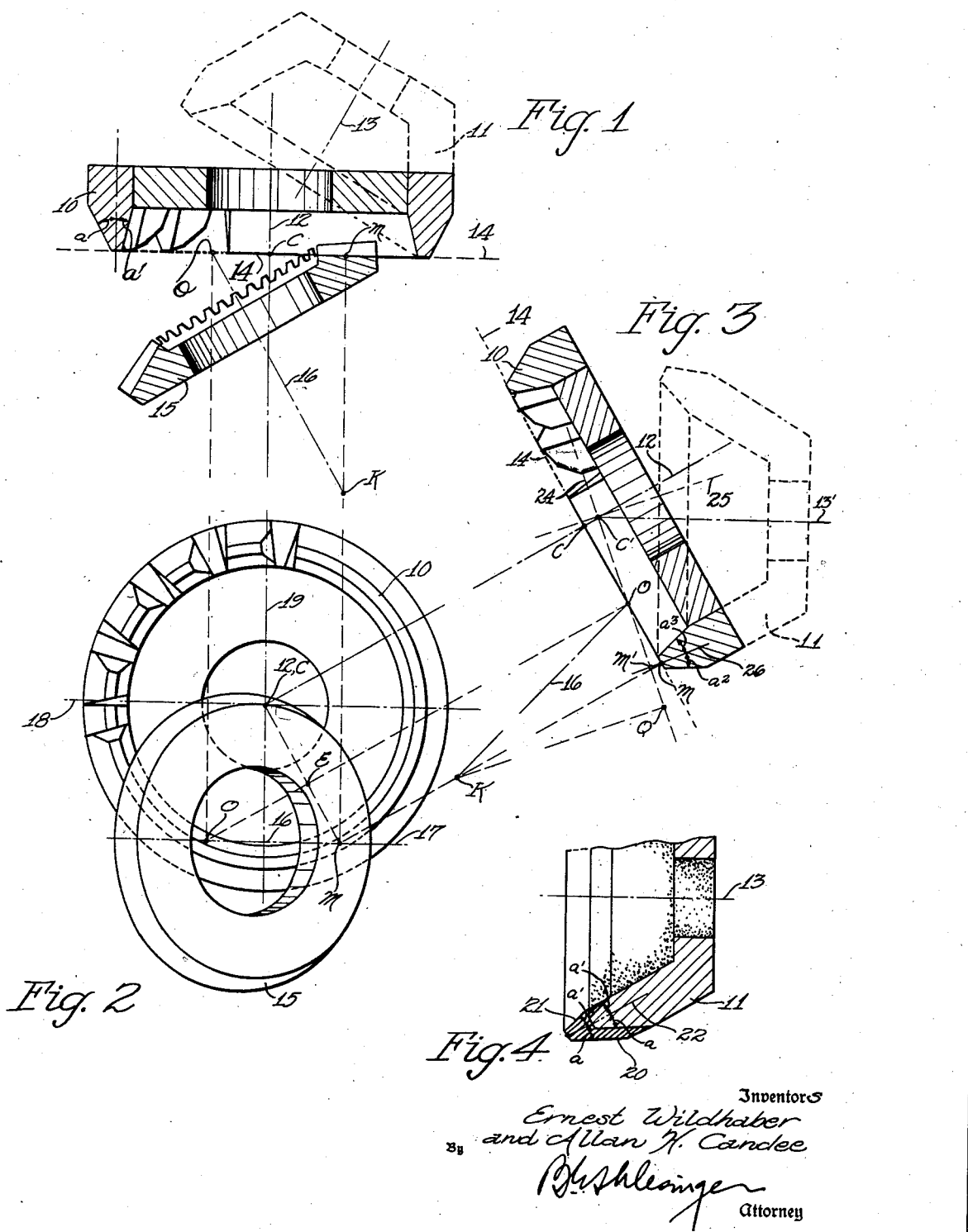
Inventors
Ernest Wildhaber
and Allan H. Candee
By [signature]
Attorney Nov. 30, 1937. E. WILDHABER ET AL 2,100,705
METHOD OF PRODUCING TAPERED GEARS
Filed May 8, 1934 2 Sheets-Sheet 2
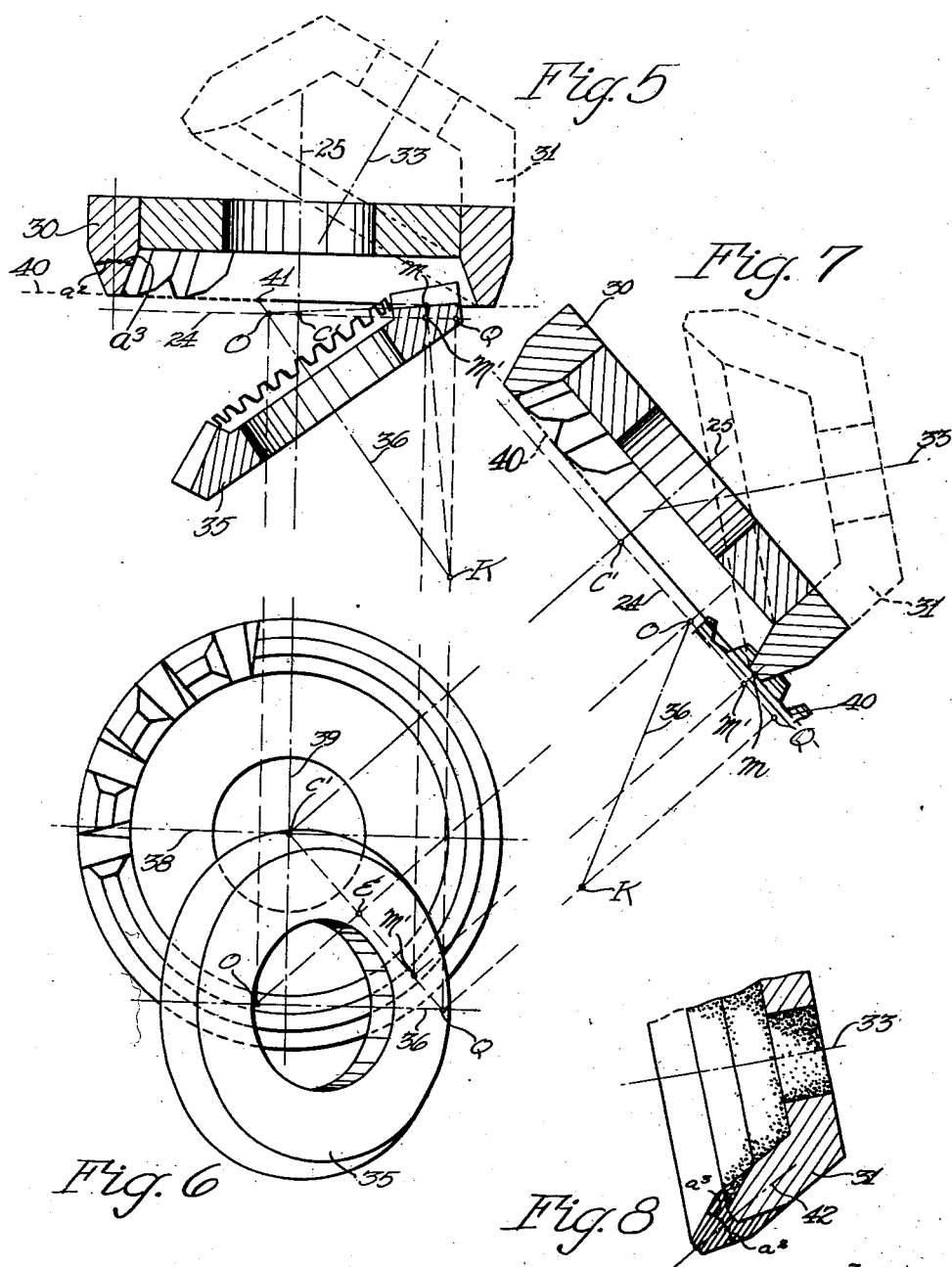
Inventors
Ernest Wildhaber
and Allan H. Candee
By
Attorney

UNITED STATES PATENT OFFICE 2,100,705

METHOD OF PRODUCING TAPERED GEARS

Ernest Wildhaber and Allan H. Candee, Rochester, N. Y., assignors to Gleason Works, Rochester, N. Y., a corporation of New York Application May 8, 1934, Serial No. 724,504

14 Claims. (Cl. 51—278)

The present invention relates to the production of longitudinally curved tooth tapered gears which have formed side tooth surfaces as contrasted with generated side tooth surfaces. More particularly, the invention relates to the production of longitudinally curved tooth tapered gears that have conical side tooth surfaces.

Tapered gears are preferably and usually made with teeth tapering in depth from their outer to their inner ends in accordance with the taper of the gear itself and for the purpose of obtaining the maximum strength at the inner ends of the teeth. In prior practice in cutting or grinding tapered gears it has been customary to adjust the blank relative to the tool so that the axis of the blank is inclined to the cutting plane of the tool at an angle equal to the root angle of the blank so that in full depth position the tip of the tool would travel in a plane tangent to the root surface of the blank and inclined to the pitch surface of the blank in accordance with the desired taper in depth of the gear teeth.

Now, since the tool travels in a path inclined to the pitch surface of the blank the cutting edges of the tool will cut their own pressure angles with reference to the root surface of the gear but not with reference to the pitch surface of the gear. In a longitudinally curved-tooth gear cut with tapering depth, the effect is different on the concave and convex sides of the teeth. On one side of the teeth, the pressure angle measured at the pitch surface will be greater than the pressure angle of the cutting tool and on the other side of the teeth, the pressure angle at the pitch surface will be less than the pressure angle of the cutting tool.

In a bevel gear, however, the pressure angles referred to the pitch surface should be equal on opposite sides of the teeth. To produce spiral bevel gears, it has been necessary heretofore, then, to produce opposite sides of the teeth with cutters or grinding wheels whose opposite side cutting edges were of unequal pressure angles. The pressure angle of the cutter or grinding wheel on one side had to be greater than the pressure angle of the tooth surface to be cut or ground thereby, while the pressure angle of the cutter or grinding wheel on the opposite side had to be less than the pressure angle of the tooth surface to be cut or ground thereby.

Hypoid gears differ from bevel gears in that in order to have the same duration of tooth contact on the two sides of the teeth it is necessary to have unequal pressure angles on the two sides of the teeth referred to the pitch line. In hypoid gears, however, the same condition has prevailed as in spiral bevel gears, viz., if the blank is adjusted to its root angle in order to cut teeth of tapering depth, then, the cutting tool will produce a pressure angle on the gear teeth measured at the pitch surface which will be different from the pressure angle of the tool and the effect on the pressure angle will be different on the two sides of the teeth. Hence in cutting hypoid gears it has heretofore been necessary to use cutters or grinding tools having pressure angles on opposite sides differing from one another not only by the required difference in pressure angle of the tooth surfaces but also by the amount necessary to take into account the fact that the tool was traveling in a path inclined to the pitch surface of the gear and also the fact that the tools would produce different effects on opposite sides of the gear teeth.

Now, there are several objections to the prior practice in cutting spiral bevel and hypoid gears. Thus, for instance, a different tool is required for every change in gear spiral angle or dedendum angle. Further, in grinding, because different pressure angles must be provided on opposite sides of the wheel, the grinding wheel is unsymmetrical and hence as it is dressed back, different amounts of stock are removed from the two sides of the wheel with the result that the wheel does not have as long a life as a symmetrical wheel.

These objections have long been recognized and as a matter of fact various successful means have been devised to avoid them in the cutting or grinding of generated gears. Thus, for instance in building spiral bevel and hypoid gear generating machines the latest practice is to provide a tilting adjustment for the cutter or grinding wheel so that a given tool can be tilted at different angles relative to the blank to produce the correct pressure angles on opposite sides of the teeth of the gear being cut regardless of its spiral and dedendum angles. Again, it is common practice on generating machines, where no tilting adjustment of the tool is provided, to change the ratio of roll between the tool and blank in order to be able to use a given cutter or grinding wheel to cut or grind gears of pressure angles different from those for which the cutter was originally intended.

In gear roughing machines, however, and in machines for finish cutting or for grinding non-generated gears, no tilting adjustment of the cutter is provided. The reason for this is to keep the machine as simple and as rigid in construction as possible. Of course, there is no rolling motion on such machines. Hence, neither of the above described expedients, viz. tilting adjustment of the cutter nor change in ratio of roll, is available for use in the roughing or finishing of non-generated spiral bevel or hypoid gears. Heretofore, then, tools having opposite side cutting edges of different pressure angles have been required for cutting opposite sides of the teeth of non-generated spiral bevel and hypoid gears of tapering tooth depths and different tools have had to be used for gears of different spiral or dedendum angles. This has meant that a large number of tools have had to be provided in a shop where any range of non-generated gears differing either in spiral or dedendum angles were to be cut.

The purpose of the present invention is to provide a method whereby a single cutter or grinding wheel may be used, on a machine in which no provision is made for tilting the tool, to cut or grind, respectively, non-generated spiral bevel or hypoid gears of tapering tooth depth and of different spiral angles and dedendum angles.

A further object of this invention is to provide a method whereby a tool having opposite side cutting edges of equal pressure angles and particularly a symmetrical grinding wheel may be used without tilting adjustment to cut or grind both sides of the teeth of a taper depth non-generated spiral bevel or hypoid gear and in fact both sides of the teeth of any taper depth non-generated spiral bevel or hypoid gear within the range of the cutter or wheel.

The purposes of the present invention are accomplished by adjusting the gear blank relative to the cutting or grinding tool so that its axis is inclined to the cutting plane of the tool at an angle differing from the root angle of the blank by an amount sufficient to cause the selected tool to produce the required pressure angles on the tooth surfaces of the gear and by changing the other adjustments of tool and blank from prior practice so as to modify the relative positions of the tool and blank to compensate for such change in angular setting of the blank.

Once the required adjustments of the tool and blank have been made the actual cutting or grinding operation is the same as in the known prior practice. The blank is held stationary during feed of the rotating or reciprocating tool into depth and when a tooth surface or a tooth space has been cut or ground, the tool is withdrawn and the blank is indexed.

Ordinarily, the cutting tools employed with the present invention will be of the face-mill type although reciprocating tools might also be employed. In finish cutting, the method is particularly adapted to the use of circular broaching cutters of the type described in the pending application of James E. Gleason, Serial No. 711,382, filed Feb. 15, 1934. Gears may be ground with either an annular grinding wheel such as shown in the patent to Gleason and Slade, No. 1,612,371 of December 28, 1926, or a swinging grinding wheel of the cupped type, such as shown in the patent to Taylor, No. 1,830,971 of November 10, 1931.

The principal objects of the invention have been referred to above. Other objects will be apparent hereinafter from the specifications and from the recital of the appended claims.

In the drawings:

Figs. 1, 2 and 3 are diagrammatic views illustrating the known method of cutting or grinding non-generated spiral bevel and hypoid gears; (Fig. 1 shows the relative position on a cutting or grinding machine of the known type of a cutter or grinding wheel and the gear blank to be cut or ground, respectively, when the tool is in full depth position. A face-mill gear cutter is indicated in full lines, while a cupped grinding wheel is indicated in dotted lines and both tools and blank are shown in section in the horizontal planes. Fig. 2 is an elevational view taken at right angles to the view of Fig. 1 and looking at the cutter in the direction of its axis. Fig. 3 is a section of the cutter taken in a plane normal to a longitudinal side surface of a tooth of the blank and showing certain relations of the cutter and blank in this normal plane;

Fig. 4 is a fragmentary sectional view of an unsymmetrical grinding wheel and illustrating in full and dotted lines the unequal wear on such a wheel as it is dressed back;

Figs. 5, 6 and 7 are views corresponding to Figs. 1, 2 and 3 respectively but illustrating the present invention, Fig. 5 showing sections through tools and blank taken in the horizontal planes, Fig. 6 an elevational view at right angles to Fig. 5, and Fig. 7 a section in the normal plane; and Fig. 8 is a view corresponding to Fig. 4 and showing how when a symmetrical grinding wheel is dressed back equal amounts of stock will be removed from opposite sides of the wheel and it will have a maximum life.

Reference will be made first to Figs. 1, 2 and 3 which illustrate the known method of producing non-generated spiral bevel and hypoid gears on machines where no tilting adjustment of the cutter or grinding wheel is provided. In cutting such gears, a tool of the face-mill type is ordinarily used such as denoted at 10. In grinding, ordinarily a dished or cupped grinding wheel is employed, such as denoted at 11, although an annular grinding wheel corresponding directly to the face-mill cutter may also be used.

If a face-mill cutter or an annular grinding wheel is used, the cutting or grinding action is produced simply by rotating the tool on its axis 12 while feeding the cutter or wheel into depth. If a cupped grinding wheel is used, this must not only be rotated on its axis 13 but must also be swung simultaneously about an axis corresponding to the axis 12 in order to grind the tooth surfaces of the gear to the correct curvature and for their full length.

The plane 14 perpendicular to the axis 12 of the face-mill cutter or annular grinding wheel 10, or perpendicular to the axis 12 about which the cupped grinding wheel 11 is swung, will be referred to as the "machine plane" or "cutting plane of the tool".

Whether gears are to be cut or ground, the known practice is to position the gear blank so that its axis 16 is inclined to the plane 14 at an angle equal to the root angle of the gear to be cut or ground. The cutter or grinding wheel and the blank are also adjusted relative to one another in accordance with the spiral angle of the gear to be produced. In the known practice, this last adjustment is effected by adjusting the cutter so that the apex O of the gear blank lies at the determined vertical distance below a horizontal plane 18 (Fig. 2) containing the axis 12 of the cutter and at the determined horizontal distance from a vertical plane 19 containing the axis of the cutter required to produce the desired spiral angle on the gear to be cut. With this adjustment, a mean point of contact M between the cutter or grinding wheel and the blank lies in a plane 17 (Fig. 2) containing the axis 16 of the blank and parallel to the axis 12 of the cutter.

In the known method of cutting non-generated spiral bevel gears, the pressure angle $a$ of the outside cutting edges of the cutter 10 or grinding wheel 11 must differ from the pressure angle $a'$ of the inside cutting edges of the grinding wheel or cutter in order to cut equal pressure angles on opposite sides of the teeth of the gear 15, measured at the pitch surface of the gear and in the known method of cutting hypoid gears, the pressure angles of outside and inside cutting edges, respectively, must differ from the pressure angles of the tooth surfaces to be cut thereby. This is for the reason given above, viz. that the plane 14 of rotation of the cutter is tangent to the root surface of the gear blank and, therefore, inclined to the pitch surface of the blank.

As pointed out above, the known method of producing gears of the type described has the disadvantage that a different cutting tool must be employed whenever a gear of a different spiral angle or a different dedendum angle is to be cut. This is true, also, with respect to the grinding wheel, but there is a further disadvantage as regards the grinding wheel which is clearly indicated in Fig. 4. In this figure, the grinding wheel is shown both when it is new and after it has been dressed back. Because the outside surface 20 of the wheel has a greater pressure angle $a$ than the pressure angle $a'$ of the inside surface 21 of the wheel, the sides of the wheel are unsymmetrically inclined to the median line 22 and when the wheel is dressed back, then, a greater amount of stock is removed from the outside surface 20 of the wheel than from the inside surface 21.

So much for the known practice. Now, while the pressure angles of the outside and inside cutting edges of a cutter 10 or of a grinding wheel 11 are unequal when referred to a plane 14, they are equal when referred to a plane 24 (Fig. 3). The pressure angle $a^2$ of the outside surface of cutter 10 or grinding wheel 11 referred to the plane 24 will be equal to the pressure angle $a^3$ of the inside surface of the cutter or grinding wheel referred to this plane, the line 26 being a median line perpendicular to this plane 24 at the point M'. Hence, if we make the plane 24 the machine plane instead of the plane 14, a cutter or grinding wheel can be used which has opposite side cutting edges of equal pressure angles, and which when positioned so that its axis 25 is perpendicular to the plane 24, will produce exactly the same pressure angles on the opposite sides of the gear teeth as would be produced by a cutter 10 or grinding wheel 11 when positioned in known manner with the plane 14 as the machine plane. Upon this concept of a new machine or cutting plane, such as the plane 24, rests the present invention.

Now, the use of a tool having symmetrical pressure angles and the use of a new machine plane 24 require that the tool and blank be repositioned relative to one another as compared with the position which a cutter 10 or grinding wheel 11 and a gear blank 15 would occupy relative to a machine plane 14 in prior known practice.

It must be remembered that neither in machines of known construction for rough cutting spiral bevel or hypoid gears, nor in machines of known construction for finish cutting non-generated spiral bevel or hypoid gears, nor in machines of known construction for grinding non-generated spiral bevel or hypoid gears is there any provision for adjusting the cutter angularly so as to tilt the axis of the cutter from a position 12 to a position 25. In all of these machines, the axis of tool spindle and the axis of the work spindle are fixed in space and horizontal. Our problem is, therefore, to use machines in which the directions of the axes of tool movement and blank rotation are fixed and are in horizontal planes and re-adjust the cutter and blank relative to one another so as to attain the effect of tilting the axis of the cutter from the position 12 to the position 25 without actually making any angular adjustment of such axis.

The point of intersection of the axis 25 with the new machine plane 24 is indicated at C' in Fig. 3. This plane is selected so as to contain the cone apex of the blank. A point K in the blank axis 16 projects to the new machine plane 24 in the point Q and the point M projects to the point M'.

In Figs. 5, 6 and 7, 30 designates a face-mill gear cutter or annular grinding wheel and 31 denotes a cupped cutter or grinding wheel. These tools have equal outside and inside pressure angles $a^2$ and $a^3$. The axis of rotation of the cupped grinding wheel 31 is denoted at 33. Any of these tools may be used according to the present invention to produce teeth of tapering depth and of any desired pressure angle on a non-generated spiral bevel or hypoid gear 35. In these figures, the axis 25 of rotation of the cutter or wheel 30 or of swing of the wheel 31 is the same as the axis 25 in Fig. 3 and is assumed to lie in a horizontal plane. The axis 36 of the gear 35 to be cut is also assumed to lie in a horizontal plane. The plane 24 is the same as the plane 24 in Fig. 3. The triangle MOK in Fig. 5 is the same as the triangle MOK in Fig. 1.

Due to the use of a new machine plane 24, the gear is no longer adjusted to its root angle MOK but is adjusted so that its axis 36 is inclined at an angle QOK to the new machine plane 24 different from its root angle. The other adjustments of the cutter and blank can be readily determined.

In Fig. 6 the distance OE is the same as the distance OE in Fig. 2, and the distance EQ is the same as the distance OQ in Fig. 3, the angle QEO being 90°. Also in Fig. 6, the distance EM' is the same as the distance OM' in Fig. 3. The projection of the gear axis 36 to the new machine plane 24 is OQ and since the gear axis must be horizontal in the machine, the point Q is placed on the horizontal line through the gear apex O. The distance from M' to C' becomes the radius of the cutter or wheel 30 or the radius of swing of the grinding wheel 31 at the middle point of a blade or of a wheel.

The new vertical and horizontal tool settings in the cutting or grinding machine, then, are respectively, the distances in Fig. 6 of the apex O of the blank, respectively, from the horizontal and vertical planes 38 and 39, respectively, through the cutter axis or axis of swing 25. It will be noted that the mean contact point M' between the tool and gear lies outside the projected gear axis 36 instead of on this axis as in the prior art.

Now, if the tool 30 or 31 were actually positioned so that its tip travelled in the plane 24, it would cut or grind teeth of excessive depth, as clearly indicated in Fig. 5. To cut or grind teeth of correct depth, then, the tool 30 or 31 must be withdrawn away from the new machine plane in the direction of the axis 25, a distance M'M to a position where it will cut or grind teeth of the proper depth. The plane 40 of travel of the tip of the tool in full depth position is, then, parallel to the calculated machine plane 24, and the blank axis 36 intersects the actual cutting or grinding plane 40 in a point 41 offset from its apex O.

While in the instance illustrated, it is necessary to withdraw the cutter or grinding wheel in the direction of the axis 25, there are instances where the cutter or grinding wheel must be advanced in the direction of this axis in order to cut or grind the correct depth on the gear.

With the present invention, then, the blank to be cut or ground is adjusted angularly relative to a plane 40 perpendicular to the axis 25 of rotation or swing of the tool so that the blank axis 36 is inclined to this plane at an angle QOK different from its root angle MOK; the cutter axis 25 is adjusted a different horizontal and a different vertical distance from the gear apex O from the position the cutter axis would occupy in the prior known method; and the cutter or wheel is withdrawn or advanced in the direction of the axis 25 in order to cut or grind teeth of the correct depth.

After the various described adjustments have been made, the gear teeth may be formed with the face-mill cutter or annular grinding wheel 30 by rotating the cutter or wheel on its axis 25 and simultaneously feeding the cutter or wheel along the axis 25 until full depth position is reached, or the gear teeth may be formed with the cupped tool 31 by rotating the tool on its axis 33 while swinging the tool about the axis 25 and feeding the tool along this axis 25 until full depth position is reached. After either tool has cut or ground the tooth surfaces to full depth, it is withdrawn and the blank indexed. The blank, of course, is held stationary during the feed movement.

Ordinarily straight-sided cutters or grinding wheels will be employed, although it is within the scope of the invention to use formed cutters or wheels of other shapes. The tooth surfaces cut or ground with a straight-sided wheel will be conical surfaces of revolution, centered on the axis 25 of rotation of the cutter or of swing of the cupped grinding wheel. Where both sides of a tooth space are cut or ground simultaneously, the sides of the space will be coaxial conical surfaces of revolution.

While the invention has been described in connection with cutters or grinding wheels having equal pressure angles on opposite sides it will be understood that by selection of suitable machine planes in each instance, a cutter or grinding wheel having unequal pressure angles on opposite sides may be used to cut or grind a whole range of gears whose opposite side tooth surfaces have pressure angles different from those which the cutter or grinding wheel was intended to cut according to the known prior method. This permits the use of a cutter or grinding wheel, which is already on hand, for cutting or grinding gears for which the cutter or grinding wheel was not originally intended and for which it could not be used according to the prior art.

The present invention is of distinct advantage in grinding, for it permits the use, as stated above, of a wheel having equal pressure angles on both sides. This is illustrated clearly in Fig. 8, in which the wheel is shown both when it is new, and after it has been resharpened to a considerable extent. $a^2$ and $a^3$ are the equal pressure angles of opposite sides of the wheel in both cases, and 42 designates a median line of the wheel surfaces.

While reference has been made to the fact that the axes of the cutter or grinding wheel and of the gear blank are maintained in horizontal planes through the method of the present invention, it will be understood that the invention has only so been described because known cutting and grinding machines for producing non-generated curved tooth tapered gears have the work and cutter axes or the work axis and the axis of swing of the grinding wheel fixed in horizontal planes. It will be understood, however, that the invention would still be applicable were the axes of the work and of the tool movement situated in other than horizontal planes.

The present invention is not restricted to use on machines which have no generating roll, for it can be used to advantage even on a generating machine in producing non-generated tapered gears, for with the present invention it is not necessary to resort to changes in tilting adjustment of the tool in order to use a standard tool to cut both sides of a non-generated gear simultaneously to the correct pressure angles.

In general, it may be said that while the invention has been illustrated in connection with a particular embodiment it is capable of still further modification and this application is intended to cover any variations, uses, or adaptations of the invention following, in general, the principles of the invention and including such departures from the present disclosure as come within known or customary practice in the gear art and as may be applied to the essential features hereinbefore set forth and as fall within the scope of the invention or the limits of the appended claims.

Having thus described our invention, what we claim is:

1. The method of cutting longitudinally curved tooth gears which comprises employing a face-mill gear cutter, positioning the cutter and a tapered gear blank relative to one another so that the axes of the blank and cutter are parallel to a given plane and the blank axis is inclined at other than the root angle of the blank to a plane perpendicular to the axis of the cutter and containing the tip surface of the cutter and perpendicular to the first named given plane and so that the apex of the blank is offset from the plane perpendicular to the axis of the cutter, and rotating the cutter in engagement with the blank.

2. The method of cutting the tooth surfaces of a tapered gear which has longitudinally inclined teeth which comprises positioning a cutting tool and a gear blank in engagement with the axis of the gear blank inclined to the cutting plane of the tip of the tool at other than the root angle of the blank and with the apex of the blank offset from said cutting plane and so that the mean point of contact between the tool and blank is offset from a plane containing the axis of the blank and perpendicular to said cutting plane, and imparting a cutting movement to the tool while producing a relative feed movement between the tool and blank in a direction perpendicular to the plane of cut of the tip of the tool.

3. The method of cutting longitudinally curved tooth gears which comprises employing a cutting tool that is adapted to be moved about an axis to effect the cutting operation, positioning said tool and a tapered gear blank in engagement, with the axis about which the tool moves and the axis of the blank parallel to a given plane and with the blank axis inclined at other than the root angle of the blank to a plane perpendicular to said given plane and constituting the plane of cut of the tip of the tool and with the apex of the blank offset from said second-named plane, and imparting cutting movement to the tool about the described axis.

4. The method of grinding tooth surfaces of a tapered gear having longitudinally curved teeth which comprises employing a cupped grinding wheel which is adapted to rotate on its own axis and simultaneously swing about another axis to produce the lengthwise shape of the tooth surfaces, which comprises positioning the wheel and a tapered gear blank in engagement with the axis of the blank and the axis about which the wheel swings parallel to a given plane and with the blank axis inclined at other than the root angle of the blank to a plane perpendicular to the axis about which the wheel swings and which constitutes the cutting plane of the tip of the wheel and with the apex of the blank offset from the last named plane, and rotating the wheel on its axis and simultaneously imparting a swinging movement to the wheel.

5. The method of cutting longitudinally curved tooth gears which comprises employing a face-mill gear cutter, positioning the cutter and a tapered gear blank in engagement, with the axes of the blank and cutter parallel to a given plane and so that a mean point of contact between the cutter and blank is offset from a plane which contains the blank axis and which is parallel to said given plane, and with the blank axis inclined at other than the root angle of the blank to a plane perpendicular to the axis of the cutter and containing the tips of the cutting blades and perpendicular to said given plane, and with the apex of the blank offset from said plane perpendicular to the axis of the cutter, and rotating the cutter in engagement with the blank.

6. The method of cutting tooth surfaces of a longitudinally curved tooth gear which comprises employing a tool that is adapted to be moved about an axis to effect the cutting operation, positioning the tool and a tapered gear blank in engagement so that said axis and the axis of the blank are parallel to a given plane and so that a mean point of contact between the tool and the blank is offset from a plane which contains the blank axis and which is parallel to said given plane and so that the blank axis is inclined at other than the root angle of the blank to the plane of cut of the tip of the tool and the apex of the blank is offset from said last named plane, and imparting cutting movement to the tool about its axis.

7. The method of grinding tooth surfaces of a tapered gear having longitudinally curved teeth which comprises employing a cupped grinding wheel which is adapted to rotate on its own axis and simultaneously swing about another axis to produce the lengthwise shape of the tooth surfaces, which comprises positioning the wheel and a tapered gear blank in engagement with the axis of the blank and the axis about which the wheel swings parallel to a given plane and so that a mean point of contact between the wheel and blank is offset from a plane which contains the blank axis and which is parallel to said given plane and so that the axis of the blank is inclined at other than the root angle of the blank to a plane perpendicular to the axis about which the wheel swings and constituting the plane of cut of the tip of the wheel and so that the apex of the blank is offset from said last named plane, and rotating the wheel on its axis and simultaneously imparting a swinging movement to the wheel.

8. The method of forming tooth surfaces of a tapered gear having longitudinally curved teeth of tapering depth and opposite side tooth surfaces of unequal pressure angle referred to a plane tangent to the root surface of the gear which comprises employing a face-mill gear cutter whose opposite side cutting edges are of more nearly equal pressure angle referred to a plane perpendicular to the axis of the cutter, positioning the cutter in engagement with a tapered gear blank so that the axis of the blank and the axis of the cutter are parallel to a given plane and the axis of the blank is inclined at other than the root angle of the blank to a plane which is perpendicular to the axis of the cutter and to said given plane, and so that the apex of the blank is offset from a plane containing the tip surface of the cutter, and rotating the cutter on its axis while imparting a relative feed movement between the cutter and the blank.

9. The method of forming tooth surfaces of a tapered gear having longitudinally curved teeth of tapering depth and opposite side tooth surfaces of unequal pressure angle referred to a plane tangent to the root surface of the gear which comprises employing a face-mill gear cutter whose opposite side cutting edges are of equal pressure angle referred to a plane perpendicular to the cutter axis, positioning the cutter in engagement with a tapered gear blank so that the axis of the blank and the axis of the cutter are parallel to a given plane, and the axis of the blank is inclined at other than the root angle of the blank to a plane which is perpendicular to the axis of the cutter and said given plane, and so that the apex of the blank is offset from a plane containing the tip surface of the cutter, and rotating the cutter on its axis while imparting a relative feed movement between the cutter and the blank.

10. The method of grinding tooth surfaces of a tapered gear having longitudinally curved teeth of tapering depth and opposite side tooth surfaces of unequal pressure angle referred to a plane tangent to the root surface of the gear which comprises employing a cupped grinding wheel which is adapted to rotate on its own axis and simultaneously swing about another axis to produce the lengthwise shape of the tooth surfaces and which has opposite operating surfaces of more nearly equal pressure angle referred to a plane perpendicular to the axis about which the wheel swings, positioning said wheel in engagement with a tapered gear blank so that the axis of the blank and the axis about which the wheel swings are parallel to a given plane and the axis of the blank is inclined at other than the root angle of the blank to a plane which is perpendicular to the axis about which the wheel swings and to said given plane, and so that the apex of the blank is offset from the plane of operation of the tip of the wheel, and rotating the wheel on its axis while simultaneously imparting a swinging movement to the wheel and producing a relative feed movement between the wheel and blank.

11. The method of grinding tooth surfaces of a tapered gear having longitudinally curved teeth of tapering depth and opposite side tooth surfaces of unequal pressure angle referred to a plane tangent to the root surface of the gear which comprises employing a cupped grinding wheel which is adapted to rotate on its own axis and simultaneously swing about another axis to produce the lengthwise shape of the tooth surfaces and which has opposite operating surfaces of equal pressure angle referred to a plane perpendicular to the axis about which the wheel swings, positioning the wheel in engagement with a tapered gear blank so that the axis of the blank and the axis about which the wheel swings are parallel to a given plane and the axis of the blank is inclined at other than the root angle of the blank to a plane which is perpendicular to the axis about which the wheel swings and to said given plane, and so that the apex of the blank is offset from the plane of operation of the tip of the wheel, and rotating the wheel on its axis while simultaneously imparting a swinging movement to the wheel and producing a relative feed movement between the wheel and blank.

12. The method of grinding tooth surfaces of a tapered gear having longitudinally curved teeth of tapering depth and opposite side tooth surfaces of unequal pressure angle referred to a plane tangent to the root surface of the gear which comprises employing a cupped grinding wheel which is adapted to rotate on its own axis and simultaneously swing about another axis to produce the lengthwise shape of the tooth surfaces and which has opposite operating surfaces of equal pressure angle referred to a plane perpendicular to the axis about which the wheel swings, positioning the wheel in engagement with a tapered gear blank so that the axis of the blank and the axis about which the wheel swings are parallel to a given plane and the axis of the blank is inclined at other than the root angle of the blank to a plane which is perpendicular to the axis about which the wheel swings and to said given plane and so that the apex of the blank is offset from the plane of operation of the tip of the wheel and a mean point of contact between the wheel and blank is offset from a plane which contains the blank axis and which is parallel to said given plane and rotating the wheel on its axis while simultaneously effecting a swinging movement of the wheel and producing a relative feed movement between the wheel and blank in the direction of the axis about which the wheel swings.

13. The method of forming tooth surfaces of a tapered gear having longitudinally inclined teeth of tapering depth and opposite side tooth surfaces of unequal pressure angle referred to a plane tangent to the root surface of the gear which comprises employing a tool or tools having opposite side cutting edges of more nearly equal pressure angle referred to the plane of cut of the tip of the tool or tools, positioning the tool or tools in engagement with a tapered gear blank so that the axis of the blank is inclined to the cutting plane of the tip of the tool or tools at an angle different from the root angle of the blank and so that the blank apex is offset from said cutting plane and so that a mean point of contact between the tool or tools and the blank is offset from a plane containing the blank axis and perpendicular to said cutting plane, and imparting a cutting movement to the tool or tools to move the tool or tools across the face of the blank in a direction inclined longitudinally to the pitch surface of the blank and to a generatrix of the pitch surface while producing a relative feed movement between the tool or tools and the blank.

14. The method of forming tooth surfaces of a tapered gear having longitudinally inclined teeth of tapering depth and opposite side tooth surfaces of unequal pressure angles referred to a plane tangent to the root surface of the gear which comprises employing a tool or tools having opposite side cutting edges of equal pressure angle referred to the cutting plane of the tool or tools, positioning the tool or tools in engagement with a tapered gear blank so that the axis of the blank is inclined to the plane of cut of the tip of the tool or tools at an angle different from the root angle of the blank and so that the blank apex is offset from said cutting plane and so that the mean point of contact between the tool or tools and the blank is offset from a plane containing the blank axis and perpendicular to said cutting plane, and imparting a cutting movement to the tool or tools to move the tool or tools across the face of the blank in a direction inclined longitudinally to the pitch surface of the blank and to a generatrix of the pitch surface while producing a relative feed movement between the tool or tools and the blank in a direction perpendicular to the cutting plane.

ERNEST WILDHABER.
ALLAN H. CANDEE.